Dec. 8, 1970 P. H. DIXON ET AL 3,546,707

FACSIMILE RECORDER

Filed June 25, 1968 10 Sheets-Sheet 1

INVENTORS
Paul H. Dixon
Jerry M. Zilka
by Wolfe, Hubbard, Voit & Osann
ATTORNEYS Dec. 8, 1970 P. H. DIXON ET AL 3,546,707

FACSIMILE RECORDER

Filed June 25, 1968 10 Sheets-Sheet 2

INVENTOR

Paul H. Dixon

Jerry M. Zilka by Wolfe, Hubbard, Voit & Osann

ATTORNEYS

Dec. 8, 1970 P. H. DIXON ET AL 3,546,707

FACSIMILE RECORDER

Filed June 25, 1968 10 Sheets-Sheet 3

INVENTORS
Paul H. Dixon
Jerry M. Zilka
by Wolfe, Hubbard, Voit & Osann
ATTORNEYS

FACSIMILE RECORDER

Filed June 25, 1968

INVENTOR
Paul H. Dixon
Jerry M. Zilka
by Wolfe, Hubbard, Voit & Osann
ATTORNEY

Dec. 8, 1970 P. H. DIXON ET AL 3,546,707

FACSIMILE RECORDER

Filed June 25, 1968 10 Sheets-Sheet 5

INVENTORS
Paul H. Dixon
Jerry M. Zilka
by Wolfe, Hubbard, Voit & Osann
ATTORNEYS INVENTORS
Paul H. Dixon
Jerry M. Zilka
by Wolfe, Hubbard, Voit & Osann
ATTORNEYS Dec. 8, 1970 P. H. DIXON ET AL 3,546,707

FACSIMILE RECORDER

Filed June 25, 1968 10 Sheets-Sheet 7

INVENTOR
Paul H. Dixon
Jerry M. Zilka
by Wolfe, Hubbard, Voit & Osann
ATTORNEY

FACSIMILE RECORDER

Filed June 25, 1968 10 Sheets-Sheet 8

INVENTOR
Paul H. Dixon
Jerry M. Zilka
by Wolfe, Hubbard, Voit & Osann
ATTORNEY

Dec. 8, 1970 P. H. DIXON ET AL 3,546,707

FACSIMILE RECORDER

Filed June 25, 1968 10 Sheets-Sheet 9

INVENTOR
Paul H. Dixon
Jerry M. Zilka
by Wolfe, Hubbard, Voit & Osann
ATTORNEYS

Dec. 8, 1970 P. H. DIXON ET AL 3,546,707

FACSIMILE RECORDER

Filed June 25, 1968 10 Sheets-Sheet 10

INVENTOR
Paul H. Dixon
Jerry M. Zilka
by Wolfe, Hubbard, Voit & Osann
ATTORNEY

United States Patent Office
3,546,707
Patented Dec. 8, 1970

3,546,707

FACSIMILE RECORDER

Paul H. Dixon, Belvidere, and Jerry M. Zilka, Winnebago, Ill., assignors to Dixon Automatic Tool, Inc., Rockford, Ill., a corporation of Illinois Filed June 25, 1968, Ser. No. 739,767
Int. Cl. G01d *15/06;* G11b *21/04;* H04n *1/24*
U.S. Cl. 346—74 6 Claims

ABSTRACT OF THE DISCLOSURE

For producing a facsimile of a master document scanned line-by-line by a transmitter, a facsimile recorder comprises a rotatable drum carrying a helical conductor which coöperates with a metal writing bar to create the facsimile through an electrolytic process by changing the shading of an electrolyte-treated web of paper as the web is advanced between the writing bar and the conductor along a precisely determined path and at a rate synchronized with the operation of the transmitter. The recorder includes mechanism for delivering the completed facsimile at a rapid feed-out rate much faster than the normal rate of advance undertaken by the web during printing; means for controlling the humidity of the atmosphere surrounding the web before, during and after printing; and means mounting the writing bar for adjustable pressure contact with the web, for retraction away from the web, for reciprocation across the web, and for adjustment into parallelism with the web and the axis of the drum.

BACKGROUND OF THE INVENTION

This invention relates to a recorder for producing a facsimile of a master document in response to receiving from a remote transmitter an electrical signal created by scanning the document and varying as a function of changes in the shade value of the document. More particularly, the invention relates to a facsimile recorder of the type in which the facsimile is produced by changing the shading of a moist web of electrolyte-treated paper or the like as the web is advanced between and contacted by a writing bar and a conductor on a revolving drum which is rotated in timed relation with the transmitter and with the advance of the web. The writing bar and the conductor form electrodes for receiving the signal from the transmitter and coact with the electrolyte in the web to cause the shading of the web to change in proportion to variations in the signal thereby to create a facsimile of the scanned document.

SUMMARY OF THE INVENTION

The general aim of the present invention is to provide a new and improved recorder of the above character which is capable of producing sharper, smoother and more uniform facsimiles than prior recorders of the same general type. In keeping with this aim, an object of the invention is to insure that the web will be kept moist for extended periods of time until the shading is developed and thereafter to control the humidity of the atmosphere surrounding the web in a manner that avoids distortion, wrinkling and shrinking of the facsimile. Another object is to guide the web between the writing bar and the conductor in such a manner as to maintain an optimum area of contact between the web and the conductor and thus avoid distortions in the shading of the facsimile otherwise resulting from the indiscriminate developing of too much of the web at one time.

The invention also aims to deliver the completed facsimile from the recorder much faster and easier than has been possible heretofore. For this purpose, the invention contemplates a novel drive mechanism which is selectively operable to increase the speed of the web from its normal recording rate to a rapid feed-out rate when the facsimile is finished thereby to enable quicker access to the facsimile without need of manually stripping the web from the recorder and without need of waiting for delivery of the facsimile at its relatively slow recording rate. To advantage, the drive mechanism is constructed to change the speed of the web without requiring stopping of the web so as to reduce the danger of the web being torn. This aspect of the invention is further featured by a unique mounting of the writing bar enabling automatic retraction of the latter away from the web in response to initiation of the rapid feed while also permitting reciprocation of the bar across the web to cause the bar to wear uniformly. The bar also is selectively adjustable to exert optimum pressure on the web and is adjustable into a precisely established position with respect to the web and the conductor on the drum.

Other objects and advantages of the invention will become apparent from the following detailed description taken in conjunction with the accompanying drawings.

DESCRIPTION OF THE PREFERRED EMBODIMENT

Figures 1, 2:
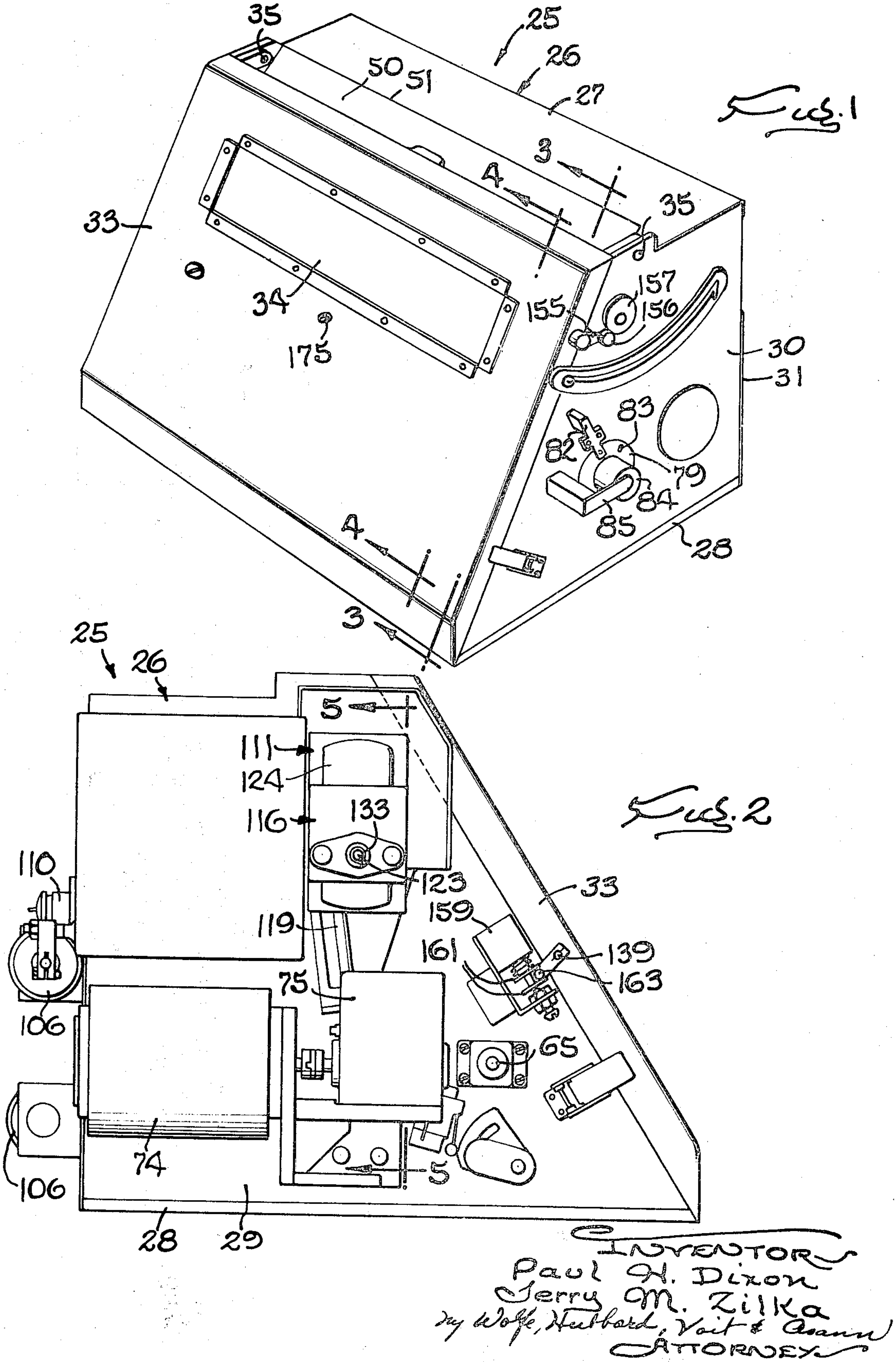
FIG. 1 is a perspective view of a new and improved facsimile recorder embodying the novel features of the present invention.
FIG. 2 is a side elevation of the recorder as viewed from the left of FIG. 1.

As shown in the drawings for purposes of illustration, the invention is embodied in a recorder 25 for producing a facsimile of a master document as an incident to receiving an electrical signal from a remote transmitter (not shown) operable to detect the shade value (i.e., the relative lightness and darkness) of any printing or pictures on the face of the document and to create the signal as a function of such shade value. A transmitter especially suitable for use with the present recorder is disclosed in the copending application of Paul H. Dixon, et al., Ser. No. 726,409, filed May 3, 1968, and is of the type which scans the master document line-by-line to detect the shade value of the printing along successive narrow lines of the document and produces an electrical signal which varies in proportion to changes in the shading along a given line. This signal may for convenience be considered as a time-varying modulated analog shading voltage which varies in magnitude according to the darkness of small unit areas scanned instant-to-instant. The transmitter signal may be converted into any desired particular form of modulation such as frequency, phase, pulse height, pulse width or pulse spacing modulation appropriate for transmission over telephone lines or other communication channels. At the recorder, the transmitted signal is appropriately demodulated, by circuits which are per se known and therefore not herein shown, in order to recreate the modulated analog shading voltage derived originally from scanning of the master document. The recorder to be described herein converts the reproduced shading voltage back into visible intelligence on the facsimile instant-to-instant and line-by-line with the same pattern and shading of the scanned lines of the master document.

Figure 15:
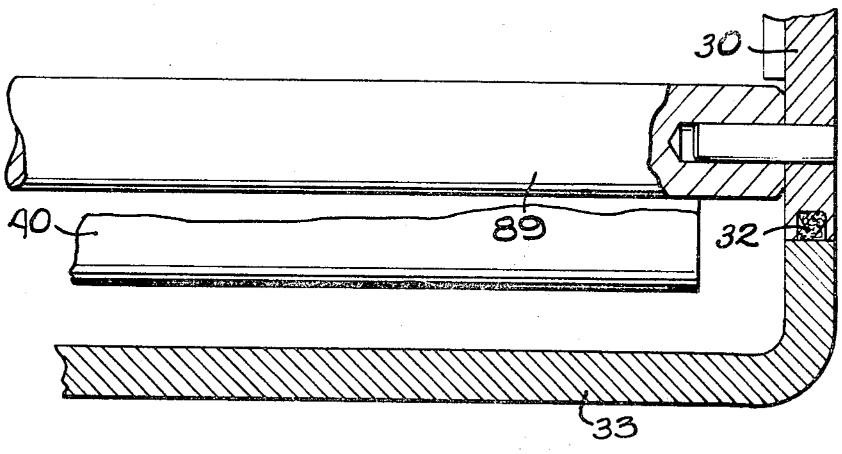
FIG. 15 is an enlarged fragmentary cross-section taken substantially along the line 15—15 of FIG. 3.

In this instance, the various operating elements of the recorder 25 are mounted on and housed within a box-like cabinet 26 constituting a frame and formed with top and bottom walls 27 and 28, left and right side walls 29 and 30, and a rear wall 31. Covering the front of the cabinet and sealed to the latter by a gasket 32 (FIG. 15) is a door 33 formed with a transparent inspection window 34 and hinged near its upper margin at 35 (FIG. 1) to the side walls to swing upwardly and outwardly for purposes of permitting access to the interior of the cabinet and to the internal operating elements of the recorder.

Figures 20, 21, 22:
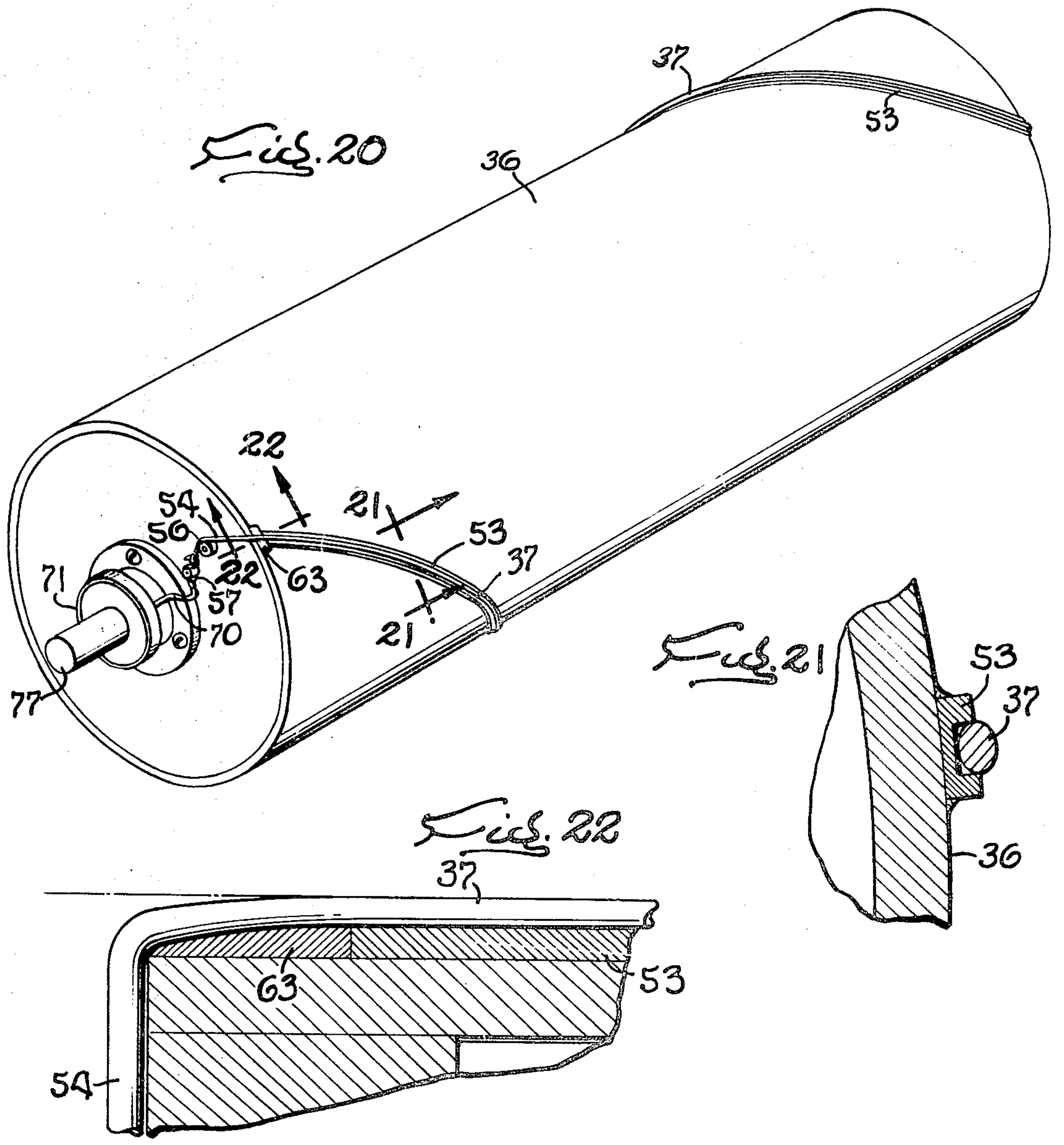
FIG. 20 is a perspective view of the conductor and the revolving drum.
FIG. 21 is an enlarged fragmentary cross-section taken substantially along the line 21—21 of FIG. 20.
FIG. 22 is an enlarged fragmentary cross-section taken substantially along the line 22—22 of FIG. 20.

To produce the facsimiles, the recorder 25 includes a revolving drum 36 (FIGS. 3, 8 and 20) housed within the cabinet 26 and carrying a signal-receiving conductor 37 which coacts with an elongated writing bar 39 (FIGS. 3, 8 and 9) made of stainless steel or other ferrous metal to change the shading of a web 40 of paper or other flexible material by an electrolytic process as the web is advanced between and physically contacted on opposite sides by the writing bar and the conductor. The web is sold commercially by several manufacturers, is commonly known as electrolytic recording paper, and is impregnated with a solution of liquid electrolyte which coacts with the writing bar and the conductor to form an electrolytic conduction path through the web for purposes of transforming the electrical signal from the transmitter into visible printing on the web. The writing bar 39 and the conductor 37 constitute positive and negative electrodes connected into the recorder circuits for reproducing the shading voltage and poled such that a variable shading current proportional to the shading voltage is conducted from the bar, through the electrolyte in the web, and then to the conductor. As the current passes through the electrolyte, the metallic ions are extracted from the writing bar and are deposited or plated on the web to change the shading of the paper. Darker areas are developed on the web as the magnitude of the current increases and lighter areas are formed as the current decreases with the shading of the web changing in proportion to the magnitude of the current and, since the current at any given instant is representative of the shade value of a scanned unit area of the master document, a similarly shaded unit area is produced on the web to effect printing of the facsimile.

Figure 3:
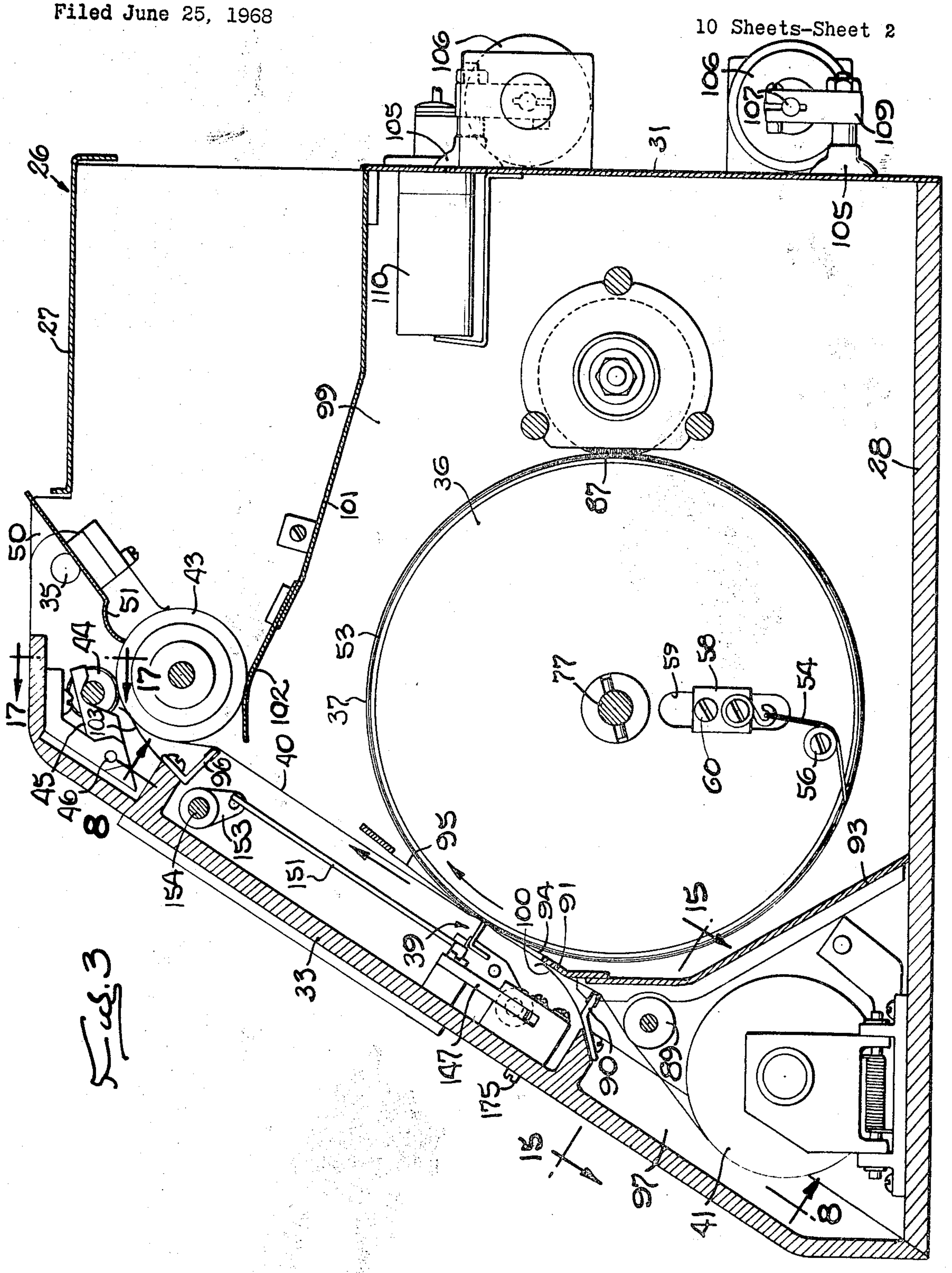
FIG. 3 is an enlarged cross-section taken substantially along the line 3—3 of FIG. 1.
Figure 4:
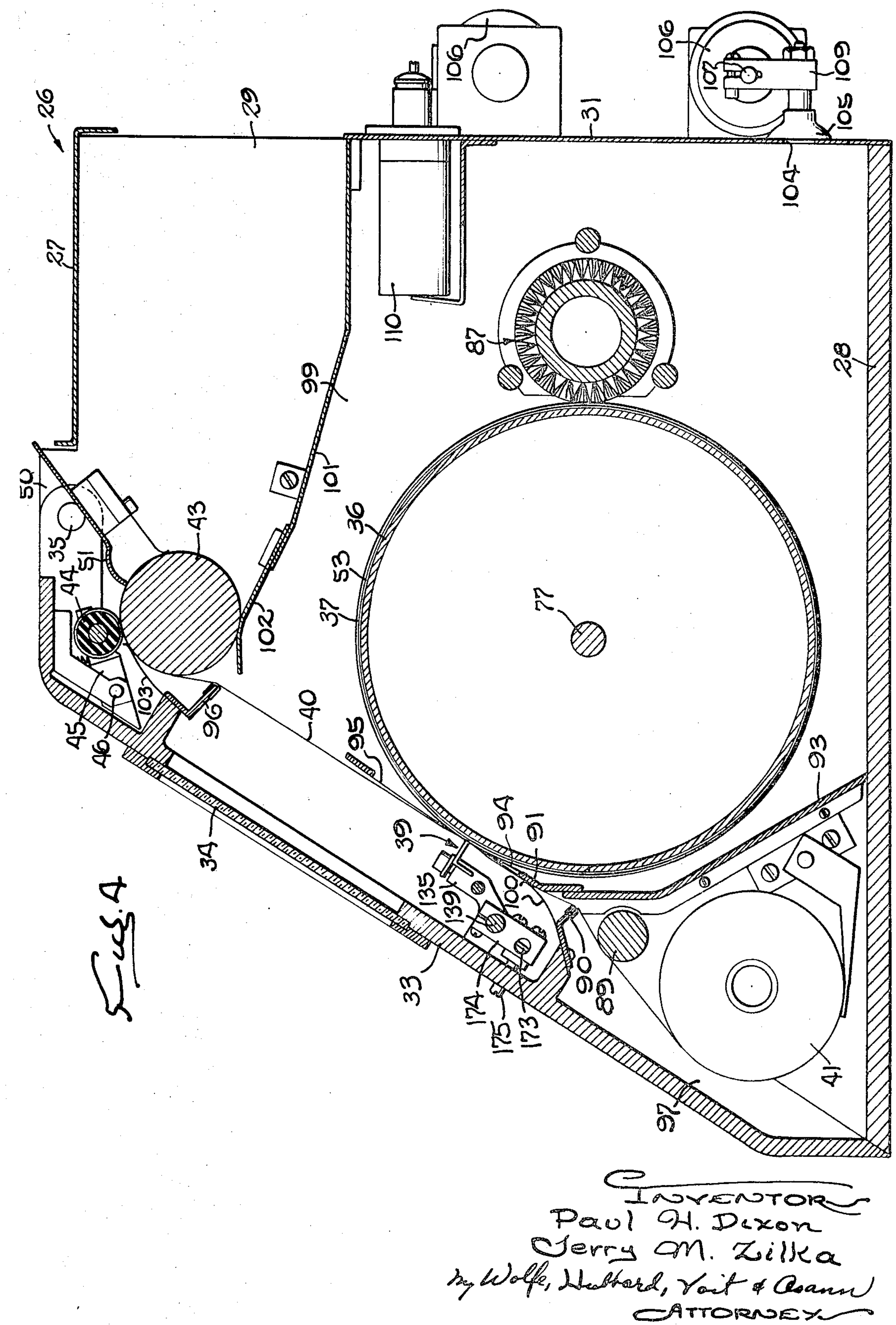
FIG. 4 is an enlarged cross-section substantially along the line 4—4 of FIG. 1.
Figure 17:
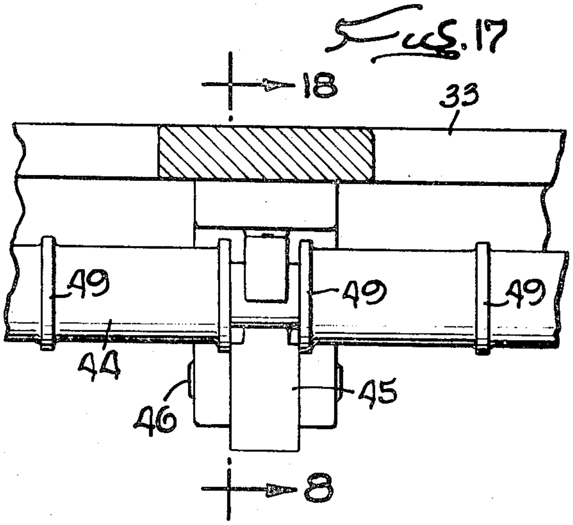
FIG. 17 is an enlarged fragmentary cross-section taken substantially along the line 17—17 of FIG. 3

As shown most clearly in FIGS. 3 and 4, the web 40 is stored on and wrapped around a supply roll 41 rotatable within the lower forward portion of the cabinet 26, and is drawn off of the roll at a predetermined rate and advanced upwardly between the drum 36 and the writing bar 39. The latter is mounted in a horizontal position on the inner side of the door 33, extends transversely across the web and parallel to the axis of the drum, and is formed with a web-contacting edge with a thickness of approximately .012″. Advancement of the web between the writing bar and the drum is effected by a feed roller 43 journaled in the upper forward portion of the cabinet and power-rotated in synchronism with the drum. A free-running pressure roller 44 mounted on the inside of the door presses the web into frictional engagement with the feed roller 43 and is adapted to be retracted away from the web when the door is opened thereby to enable initial threading of the web between the two rollers. The pressure roller is journaled on three brackets 45 (as shown, for example, in FIGS. 3 and 18) spaced across and pivoted to the door at 46, and is urged downwardly into pressing engagement with the web by coil springs 47 (FIG. 18) compressed between the brackets and the upper part of the door. Enlarged ribs 49 (FIG. 17) spaced axially along and protruding radially from the periphery of the pressure roller help effect uniform and straight line feeding of the web and also flatten the web against the feed roller to prevent the web from curling upwardly at its edges. After the printed web passes between the rollers 43 and 44, it is guided through a delivery opening 50 (FIG. 3) in the top wall 27 of the cabinet by a stripper plate 51 positioned with one edge in engagement with the feed roller to keep the web from sticking to and wrapping around the roller.

Figure 23:
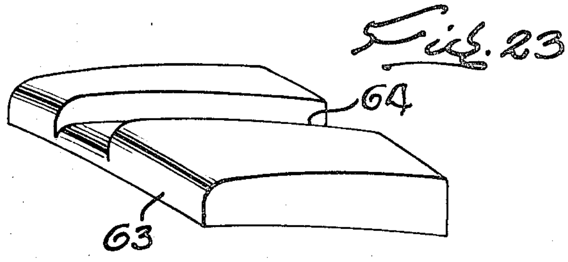
FIG. 23 is a perspective view of a part shown in FIG. 22.

Herein, the revolving drum 36 is journaled to turn in a clockwise direction (FIG. 3) about a horizontal axis near the center of the cabinet 27 and carries the conductor 37 which is simply a metal wire such as piano wire with a diameter of .025″. The wire 37 is wrapped helically around the drum through almost one convolution and is fitted within a U-shaped channel member 53 (FIGS. 20 to 22) spiraled around the periphery of the drum and made of non-conductive material. Each end portion 54 of the wire is bent along the corresponding end wall of the drum and is trained over a non-conductive guide 56 (FIG. 12) on the end wall. The left end portion of the wire is secured to the left end wall of the drum by a fastener 57 (FIGS. 5 and 20), and the right end portion of the wire is anchored to and insulated from an adjustable two-piece clamp 58 (FIG. 12) fitted within a radially extended slot 59 formed in the right end wall of the drum. By loosening a clamping screw 60 (FIGS. 12 and 13) and by turning an adjusting screw 61, the clamp 58 may be moved radially of the drum to various positions in the slot to enable optimum tensioning of the wire on the drum. Preferably, a gradually sloping shoe 63 (FIGS. 22 and 23) with a groove 64 for receiving the wire is mounted on the periphery on the drum at the left end thereof to reduce the sharpness in the bend in the wire and to facilitate movement of the wire past the writing bar 39 in a smooth manner.

The circuitry in the recorder 25 for reproducing the shading voltage receives the signal from the transmitter through a power cable 65 (FIG. 2) leading into the cabinet 26 and is connected into the writing bar 39 and the wire 37 such that the writing bar resides at a positive potential with respect to the wire. A set of spring clips 66 (FIG. 6) near the front of the cabinet form the positive terminal of the circuitry and, when the door 33 is closed, interfit with a contact blade 67 (FIG. 8) fastened to the door and connected electrically to the writing bar by a lead 69 to conduct current from the clips to the bar. After passing through the electrolyte in the web 40, the current flows from the wire 37 through a short lead 70 (FIG. 5) near the left end of the drum 36, a slip ring 71 rotatable with the drum, and a contact brush 73 (FIGS. 5 and 6) riding across the slip ring and forming the negative terminal of the circuitry.

Since the wire 37 is spiraled around the drum 36, rotation of the latter causes successive points along the length of the wire to be sequentially presented opposite the writing bar 39 and to sequentially contact one side of the web 40 while the other side of the web is being contacted across its width by the writing bar. Thus, during one revolution of the drum, the electrolytic path formed by the bar, the electrolyte in the web, and the instantaneous contact point of the revolving wire progresses in a straight line along the writing bar and across the width of the web to cause the shading of small unit areas of the web along the line to develop successively according to the magnitude of the current flowing through the electrolytic path at the time of contact of the wire with the web. In this way, the shading on the web is developed or printed unit-by-unit and line-by-line along closely spaced parallel lines across the width of the web as the drum is rotated through successive revolutions and as the web is advanced past the drum. The drum is precisely synchronized with the transmitter and is rotated through one revolution during the time required for the transmitter to scan one line of the master document. In addition, the web is advanced past the drum at a rate synchronized with the rate that the transmitter scans successive lines of the master document. As a result, the shading of the web is developed line-by-line in the same pattern as the corresponding lines of the document thereby to produce an exact facsimile.

By way of example, the drum 36, which herein has a diameter of about 7¾″, may be rotated at 90 r.p.m. while the web 40 is fed past the drum at a recording rate of approximately one inch per minute. To improve the quality of the facsimile, the scanning rate of the transmitter may be reduced to one-half its normal rate, the drum may be slowed down to 45 r.p.m. and the paper fed at about one-half inch per minute. In either instance, the web is printed at a rate of 96 lines per inch along lines which are about .010″ in width and which are spaced from one another by approximately .010″.

To rotate the drum 36, a two-speed synchronous motor 74 (FIG. 2) mounted on the left side wall 29 of the cabinet 26 drives a gear box 75 whose output shaft 76 (FIG. 5) is connected to rotate a shaft 77 extending through and coupled to the drum. The right end of the drum shaft 77 projects outwardly through the corresponding cabinet wall 30 and carries a circular disc 79 (FIGS. 11 and 12) which rotates through a light beam directed from a small electric lamp 80 (FIG. 14) toward a photoelectric sensor 81, the lamp and the sensor being mounted on a bracket 82 on the outer side of the right side wall 30 just above the drum shaft 77. Once during each revolution of the drum, an aperture 83 (FIGS. 11 and 14) formed in the disc 79 registers with the beam to allow light to pass through the disc to the sensor 81 to trigger the latter and thereby produce a signal whose time of occurrence in relation to a similar signal at the transmitter is indicative of the position of the drum. With appropriate circuitry (not shown), the signal is detected and is utilized to keep the drum and the transmitter operating in synchronism.

Figures 11, 12, 13, 14:
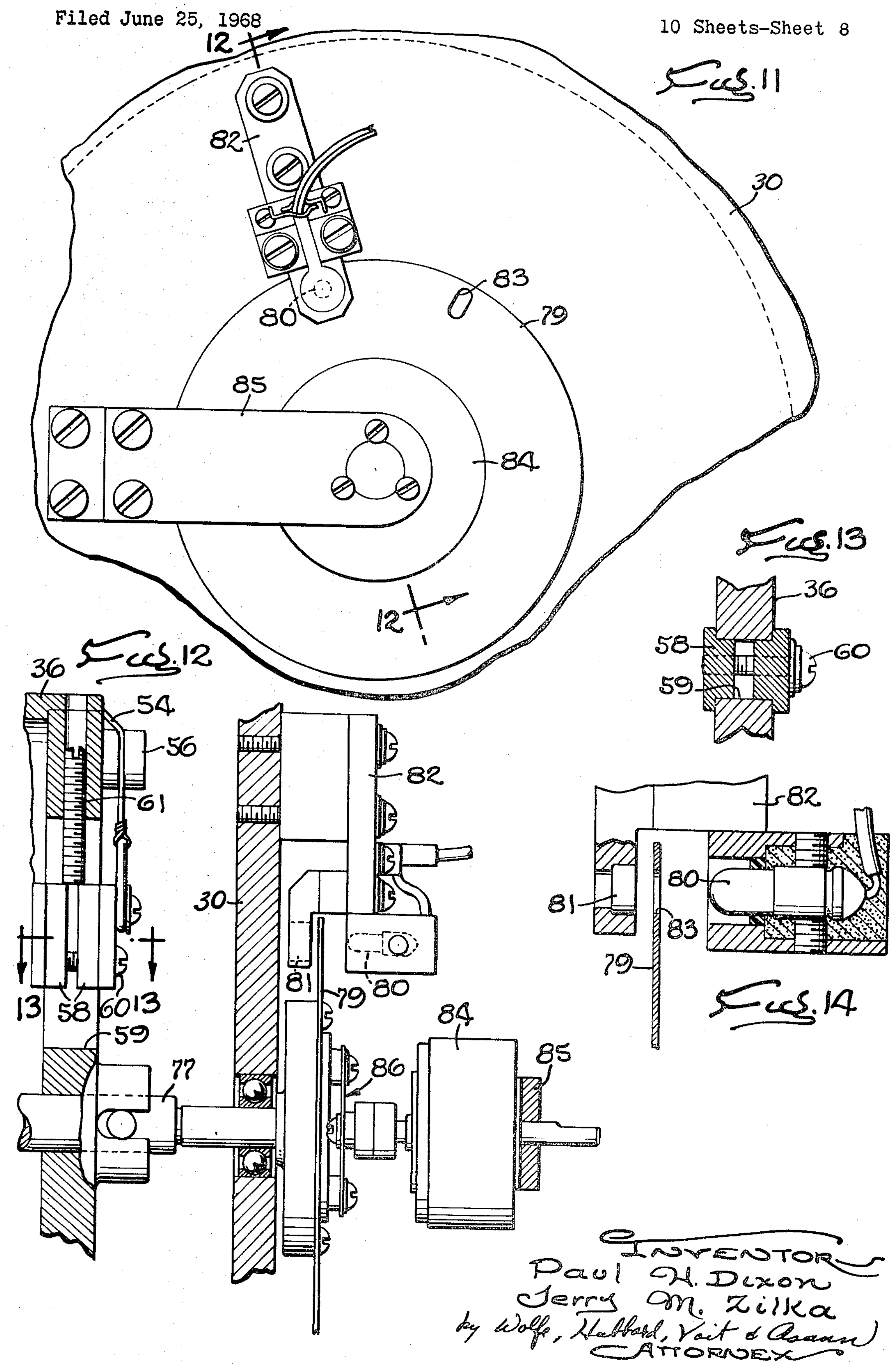
FIG. 11 is an enlarged elevational view of parts shown in FIG. 1.
FIG. 12 is a fragmentary cross-section taken substantially along the line 12—12 of FIG. 11.
FIG. 13 is a fragmentary cross-section taken substantially along the line 13—13 of FIG. 12.
FIG. 14 is an enlarged view of elements shown in FIG. 12 with parts broken away and shown in section.

Advantageously, means are provided for exerting a continuous drag or retarding torque on the drum 36 in order to prevent fluctuations in the speed of the drum and thus maintain the drum rotating at a uniform rate at all times. Preferably and as shown in FIG. 12, this means herein comprises an eddy current brake 84 whose stator is anchored to the right cabinet wall 30 by an arm 85 and whose rotor is connected to the right end of the drum shaft 77 by a coupling 86. The brake 84 is energized continuously during printing of the web 40 and applies a constant retarding torque to the drum. With the brake exerting a drag on the drum, the gearing in the gear box 75 is loaded uniformly and constantly in one direction. Any tendency for the drum to move ahead as a result of backlash clearance in the gearing or as a result of imbalance of the drum thus is eliminated.

As the drum 36 turns, a free-running brush 87 (FIG. 4) journaled for rotation in the cabinet side walls 29 and 30 sweeps across the wire 37 and removes any foreign material such as lint and fibers which normally collect between the wire and the channel member 53 and cause leakage or fringe conduction of the shading current to areas of the web 40 adjacent those in direct contact with the wire. As shown in FIG. 4, the brush is positioned at the rear side of the drum with its bristles in contact with the channel member 53 such that the brush is revolved by engagement of the bristles with the wire as the drum is rotated. With the brush being rotatable, the bristles sweep across the wire with a scrubbing action to remove the foreign material collecting around the channel member 53 thereby helping to prevent the formation of irregular light and dark streaks on the web that otherwise would occur as a result of the shading current leaking through the web by way of the foreign material.

In order for the printing on the web 40 to be sharp and uniform, the web must be guided past the wire 37 in such a manner as to prevent the web from being contacted by surfaces of the wire other than those directly opposite the writing bar 39 so that the shading current will not leak indiscriminately through the web and cause ghosting and blurring. According to the invention, an optimum contact area between the wire and the web is established and maintained by guiding the web along a path parallel to a tangent of the drum 36 and spaced from the wire as the web approaches and recedes from the wire, and by utilizing the writing bar to deflect the web out of such path and into contact with the wire along a line directly opposite the writing bar. In this way, each point of the web is contacted once and only once by a surface of the wire approximately equal in width to the thickness of the web-contacting edge of the writing bar to avoid leakage of the shading current through the electrolyte to areas of the wire other than those opposite the bar.

Figures 9, 10:
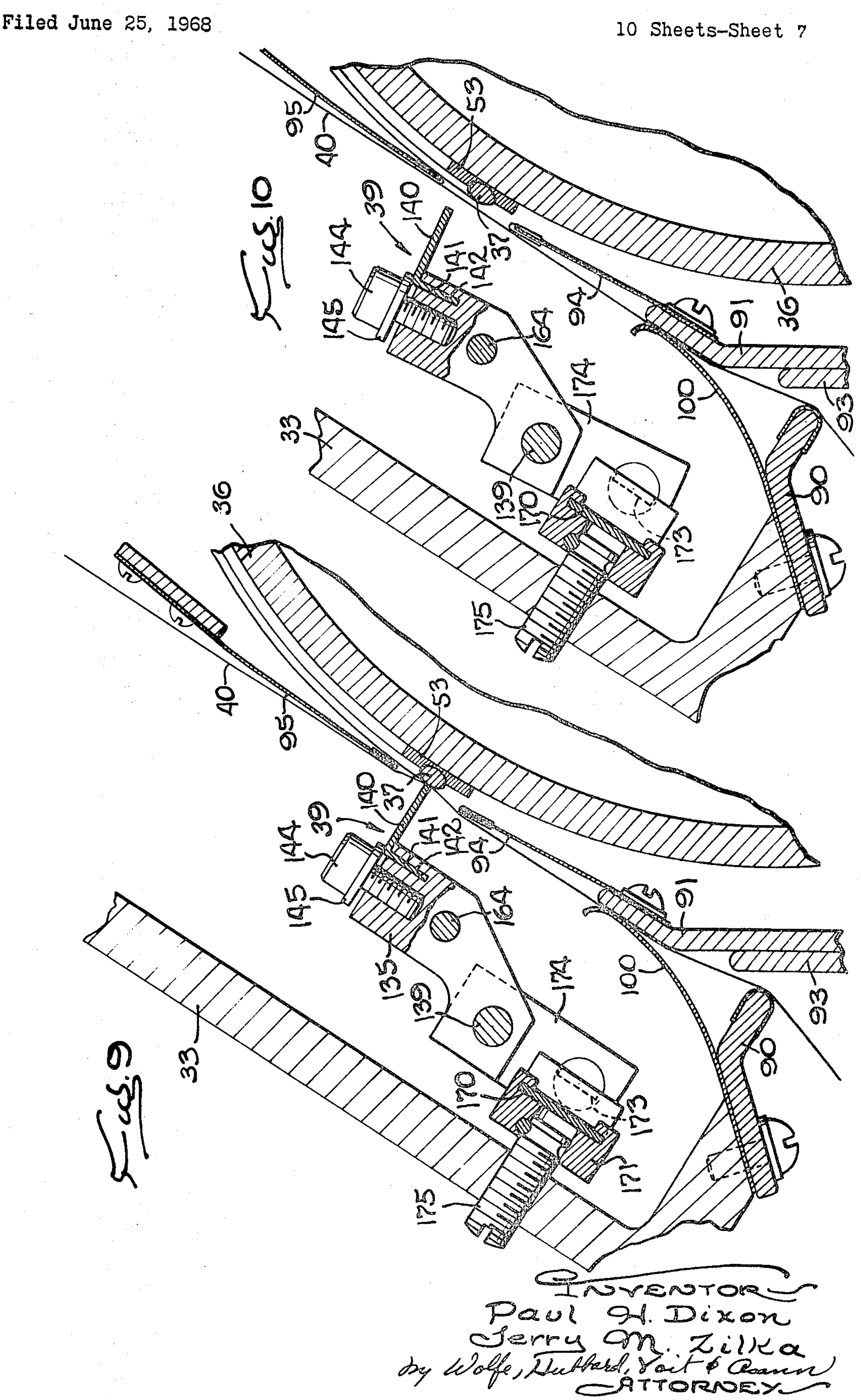
FIG. 9 is an enlarged fragmentary cross-section taken substantially along the line 9—9 of FIG. 8.
FIG. 10 is a view similar to FIG. 9 but showing the writing bar in a retracted position.

More particularly and as shown in FIG. 3, the web 40, after being drawn off of the supply roll 41, passes across a free-running idler roller 89 journaled between the side walls 29 and 30. Thereafter, the web passes beneath and is tensioned by an insulated presser member 90 (FIGS. 3 and 9) extending horizontally across the inner side of the door 33 and operable, when the door is closed, to press the web against a non-conductive lip 91 attached to and extending along a partition 93 upstanding from the bottom wall 28 and spanning the side walls 29 and 30. The lip 91 is located just forwardly of the periphery of the drum 36 to guide the web toward the writing bar 39 along an approach path which extends generally parallel to a tangent of the drum but spaced outwardly from the outer surface of the wire 37. An elongated plastic strip 94 (FIG. 9) extending along and proejcting upwardly from the upper margin of the lip engages the rear or underside of the web and helps hold the web in its approach path. Shortly after the web passes off of the strip 94, it is engaged by the writing bar which is positioned to deflect the web out of its approach path and into contact with a surface area of the wire 37 approximately equal in width to the thickness of the bar. After contacting the wire, the web passes over a second plastic strip 95 spanning the side walls 29 and 30, and is diverted away from the wire as shown in FIG. 9 and back into a path spaced outwardly from the wire and extending parallel to a tangent of the drum in alignment with the approach path.

The web thereafter passes beneath a second presser member 96 (FIG. 3) on the upper portion of the door and is guided onto the feed roller 43.

Because the web 40 is deflected into contact with the wire 37 just as the web approaches the writing bar 39 and then is diverted sharply away from the wire, an optimum contact area between the wire and the web is established and the chances are minimized that the wire will contact areas of the web remote from the writing bar. With this guiding arrangement, streaking of the web resulting from the indiscriminate leakage of the shading current is reduced and the ultimate facsimiles are sharper and more uniform in appearance.

The present invention further contemplates forming the cabinet 26 with two separate compartments 97 and 99 (FIG. 4) which are maintained under different conditions of humidity to keep the web 40 on the supply roll 41 in a moist state and, at the same time, to avoid wrinkling and shrinking of the printed web and prevent the accumulation of moisture on the interior walls of the cabinet. Herein, the supply roll 41 is stored in the compartment 97 which is sealed off from the remainder of the cabinet to prevent the supply roll from being exposed to dry air and to keep the electrolyte in the web in a moist condition for an extended period of time. The web is printed and delivered to the feed roller 43 in the second compartment 99 which is maintained at a carefully controlled humidity level to prevent premature drying of the web and to prevent the accumulation of excess moisture in compartment 99.

More specifically, the compartment 97 (FIG. 4) enclosing the supply roll 41 is defined by the lower portion of the sealed door 33, the forward portion of the bottom cabinet wall 28, and the partition 93 spanning the cabinet side walls 29 and 30. The upper end portion of the partition 93 is spaced from the presser member 90 on the door to define an opening permitting passage of the web from the compartment, and such opening is sealed by a flexible plastic strip 100 (FIGS. 4 and 9) mounted on the presser member and bearing against the web 40 to press the latter against the lip 91. The strip 100 and the lip 91 thus establish a seal along opposite faces of the web to keep the compartment 97 in a substantially sealed condition. With the compartment sealed off from the remainder of the cabinet, dry air is prevented from entering the compartment and the web is kept moist for an extended period of time to prevent drying out of the web before the latter passes between the writing bar 39 and the wire 37 for conduction of the shading current through the electrolyte.

The compartment 99 encloses the drum 36 and the writing bar 39 and in this instance is defined in part by the rear portion of the bottom cabinet wall 28, the lower two-thirds of the rear wall 31, and a cover 101 (FIG. 4) spanning the side walls 29 and 30 and attached to a plastic sheet 102 which presses against the underside of the feed roller 43. The remainder of the compartment 99 is defined by the central portion of the sealed door 33, by the seal established as a result of the strip 100 pressing the web 40 against the lip 91, and by the lower partition 93. A passage is formed at the upper end of the compartment 99 to permit delivery of the web to the feed roller 43, and is sealed by a plastic strip 103 (FIG. 4) mounted on the door 33 adjacent the upper presser member 96 and serving to press the web against the upper side of the feed roller. Thus, the compartment 99 is sealed off from the compartment 97 and also from the delivery opening 50 in the top wall 27 of the cabinet. As shown most clearly in FIG. 15, the web is narrower than the width of the cabinet and thus air within the side of the compartment 99 enclosing the drum 36 may circulate around the edges of the web to the side of the compartment enclosing the writing bar 39 so that both sides of the web are exposed to air of the same temperature and humidity.

Figure 16:
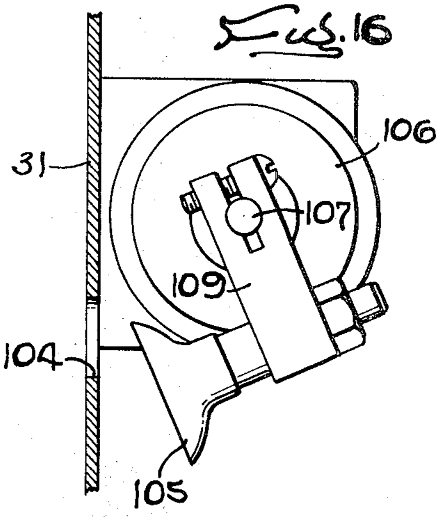
FIG. 16 is an enlarged view of parts shown in FIG. 3.

To prevent premature drying of the web 40 after the latter has been printed by the writing bar 39, the relative humidity of the air in the compartment 99 is maintained comparatively high and within a controlled range such as between 85 and 88 percent. For this purpose, a set of vents 104 (FIGS. 4 and 16) formed in the rear cabinet wall 31 are normally covered by closures or dampers 105 and are adapted to be uncovered to admit outside air into the compartment when the relative humidity in the compartment rises to or above 88 percent as a result of the moist web passing through the compartment. This insures that the moisture level of the air will not become too great and cause an excessive amount of water droplets to collect on the interior walls of the cabinet. When the relative humidity in the compartment drops to approximately 85 percent due to the drier outside air being introduced into the compartment through the vents, the dampers 105 are closed to prevent the air from becoming too dry and causing wrinkling or shrinking of the web as a result of the web drying out too fast.

Herein, the rear wall 31 is formed with three of the vents 104, two being located in the lower portion of the wall and the other being located in the upper portion of the wall just below the cover 101. Each damper 105 comprises a flexible cup located on the outer side of the rear wall and swingable into and out of engagement with the wall adjacent the respective vent to cover and uncover the latter. The cups 105 are swung between their positions as an incident to energization and de-energization of separate rotary solenoids 106 (FIGS. 3, 4 and 16) whose armatures 107 are connected to the cups by crank arms 109. Control of the solenoids is effected by a humidistat 110 (FIG. 4) mounted within the compartment 99 and operable to sense the relative humidity of the air in the compartment and to energize and de-energize the solenoids to open and close the dampers in response to the humidity exceeding or falling below the optimum range. Accordingly, sufficient moisture may be maintained in the compartment 99 to insure that the web will not dry too quickly and lose its smoothness as a result of wrinkling or shrinking and yet, at the same time, the relative humidity is prevented from rising above 88 percent to reduce the danger of excess moisture collecting on and dripping from the interior surfaces of the compartment or being propelled onto the web by the drum 36 to spoil the printed portions of the web. Also, by maintaining a controlled humidity level, the electrical resistance of the electrolyte remains generally constant to keep the shading current conducted through the electrolyte substantially proportional to the shading voltage applied to the writing bar 39 and the wire 37.

In another aspect, the invention contemplates delivering the completed facsimile out of the recorder 25 at a rapid feed-out rate to do away with the need of waiting for advancement of the facsimile from the recorder at its slower recording rate. Moreover, when the rapid feed is terminated and the recording feed once again initiated, the web 40 is immediately advanced past the drum 36 without any delay and without remaining stationary for an instant or two while the drum rotates thereby to avoid the danger of the wire contacting a portion of the web more than once and tearing the web.

To these ends, provision is made of a differential 111 (FIGS. 5 to 7) having two input elements 113 and 114 and having an output element 115 for rotating the feed roller 43 at a rate determined by the sum of the motions applied to the input elements. During printing of the web, the input element 113 is driven at a relatively slow rate by the drive motor 74 and acts to advance the web between the wire 37 and the writing bar 39 at a normal recording rate synchronized with the rotation of the drum 36. When the facsimile has been completed, a high speed motor 116 (FIGS. 2 and 5) is also energized and drives the input element 114 at a rapid rate to add to the motion imparted to the feed roller by the motor 74 and thereby increase the rate of advance of the web to deliver the facsimile from the recorder through the opening 50 much faster than would be possible if the facsimile were fed out at the normal recording rate of the web. Because of the differential 111, the rotation of the feed roller is not interrupted when normal recording is resumed and the high speed motor 116 de-energized and, as a result, the web does not stop momentarily with one portion in contact with the wire 37 on the revolving drum. Thus, there is no danger of the rotating wire contacting one portion of the moist web more than once and wearing away that portion of the web to cause the latter to tear.

Figure 5:
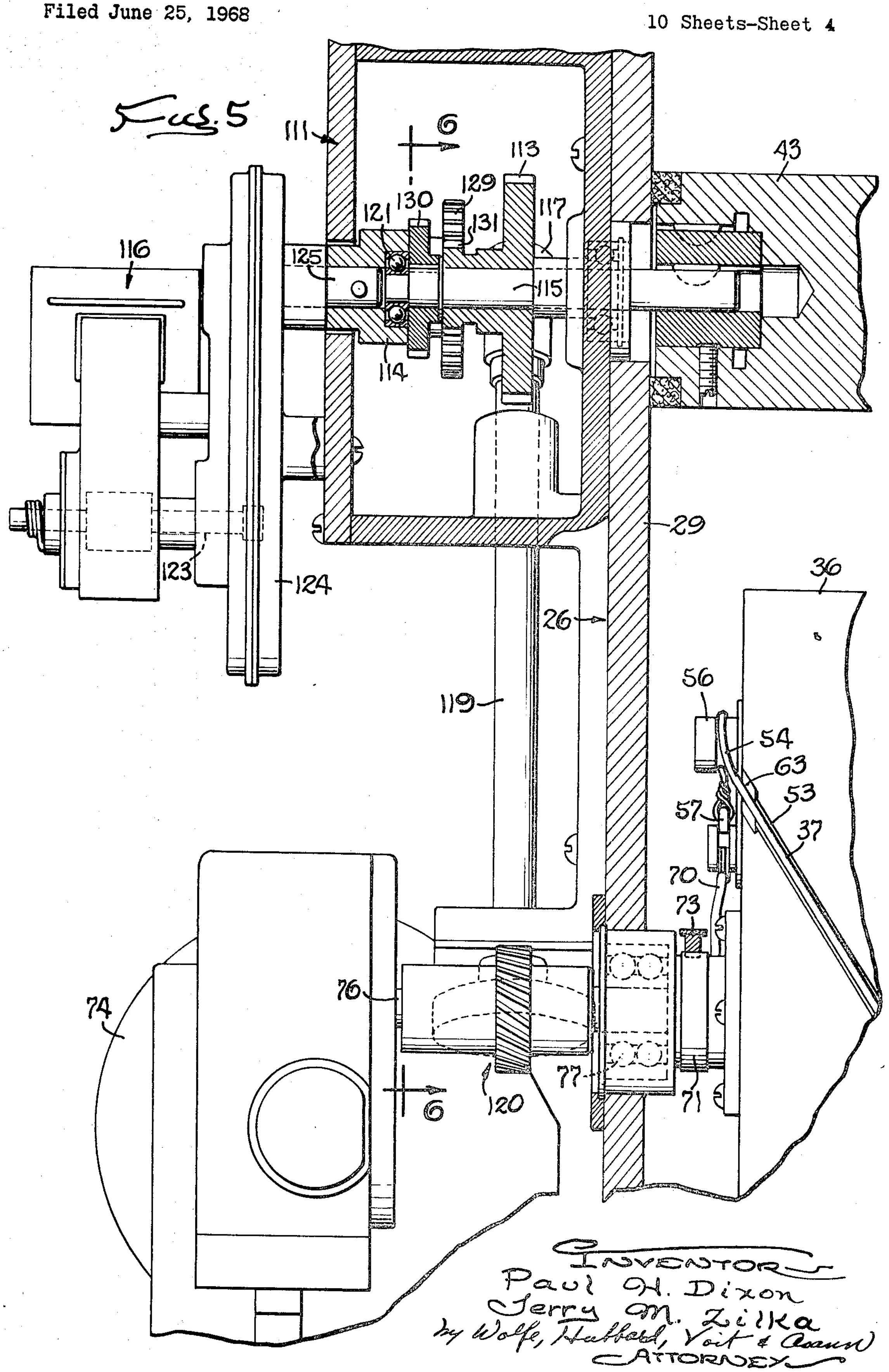
FIG. 5 is an enlarged fragmentary cross-section taken substantially along the line 5—5 of FIG. 2.
Figures 6, 7:
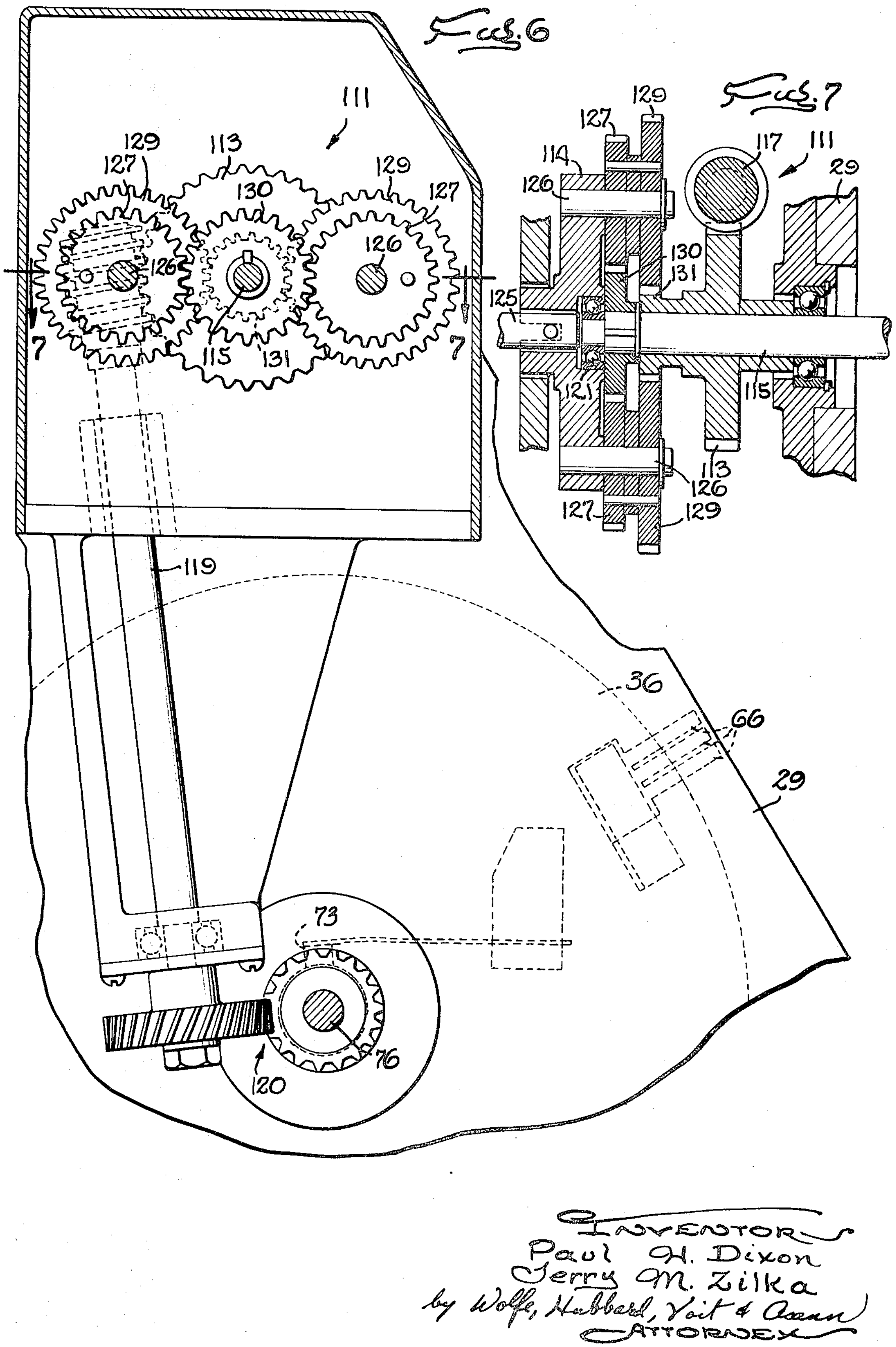
FIG. 6 is a fragmentary cross-section taken substantially along the line 6—6 of FIG. 5.
FIG. 7 is an enlarged fragmentary cross-section taken substantially along the line 7—7 of FIG. 6.

In this particular instance, the differential 111 is mounted on the outer side of the upper portion of the left side wall 29, and the output element 115 is in the form of a shaft journaled in the side wall and coupled to rotate the feed roller 43 (see FIG. 5). The input element 113 comprises a worm wheel rotatable on the output shaft 115 and driven by a worm 117 on the upper end of an elongated shaft 119 (FIGS. 5 and 6) whose lower end is coupled by gearing 120 to the output shaft 76 of the gear box 75.

The input element 114 (FIGS. 5 and 7) of the differential 111 comprises a spider journaled to rotate on the differential output shaft 115 by a bearing 121. Rotation of the spider 114 is effected by the high speed motor 116 whose drive shaft 123 (FIG. 5) is connected by a gear train in a gear box 124 to a shaft 125 keyed to the spider. Two non-rotatable spindles 126 (FIGS. 6 and 7) are carried by the spider and each rotatably mounts compound planet gears 127 and 129 which are pinned against turning relative to one another. Each of the planet gears 127 meshes with a sun gear 130 keyed to the output shaft 115, and each of the planet gears 129 meshes with a second sun gear 131 rotatable about the shaft 115 and formed as an integral extension of the hub of the worm wheel 113.

When the facsimile is being printed and the web 40 is being advanced at its relatively slow recording rate, the high speed motor 116 is de-energized and thus the spider 114 is held in a stationary position. During this time, the motor 74 drives the drum 36 through the output shaft 76 of the gear box 75, and also rotates the shaft 119 through the gearing 120 thereby to cause turning of the worm wheel 113 about the output shaft 115 of the differential 111. The sun gear 131 rotates with the worm wheel 113 and, as a result of meshing with the planet gears 129, causes both sets of planet gears 127 and 129 to rotate about the spindles 126 on the spider 114. In rotating, the planet gears 127 turn the sun gear 130 to rotate the differential output shaft 115 thus resulting in turning of the feed roller 43 to advance the web 40 past the drum 36 in timed relation with the latter and at a rate of either one or one-half inch per minute as determined by the speed selected for the drive motor 74.

After the facsimile or any desired portion thereof has been printed, the high speed motor 116 may be energized to deliver the facsimile out of the recorder 25 at the rapid feed-out rate. The drive motor 74 continues to rotate the drum 36 and the feed roller 43 during energization of the high speed motor 116, and the latter simply adds to the rotational motion imparted to the feed roller by the drive motor 74 thereby to increase the speed of the web in a smooth manner. The motion of the high speed motor 116 is added to the feed roller by the spider 114 which is rotated about the differential output shaft 115 when the high speed motor is energized. As the spider rotates, the planet gears 127 not only rotate about the spindles 126 as a result of being driven by the motor 74, but also revolve or orbit around the sun gear 130 to add to the motion normally imparted to the shaft 115 during printing of the web 40. The speed of the feed roller thus is increased to deliver the facsimile out of the recorder at a rapid rate of about one inch per second. Once the facsimile has been delivered and the high speed motor de-energized, the drive motor continues to advance the web past the rotating wire 37 to avoid stoppage of the web in contact with the wire.

In accordance with another aspect of the invention, the writing bar 39 is retracted away from the web 40 as an incident to energization of the high speed motor 116 to avoid tearing the web with the bar as the web is delivered out of the recorder at its rapid feed-out rate. In addition to being mounted for retraction away from the web, the writing bar is mounted for back and forth reciprocation across the web to cause the bar to wear uniformly along its length, is mounted for precise positioning into exact parallelism with the web and the drum 36, and is mounted for selective adjustment to exert optimum pressure on the web.

Figures 18, 19:
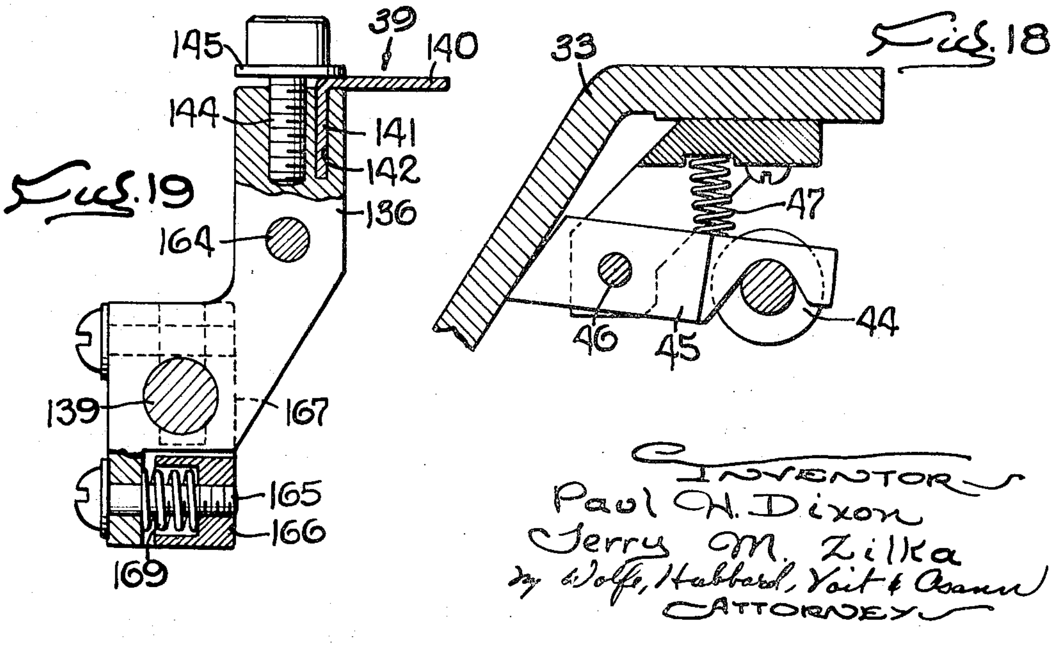
FIG. 18 is a fragmentary cross-section taken substantially along the line 18—18 of FIG. 17 but showing the parts in moved positions.
FIG. 19 is an enlarged cross-section taken substantially along the line 19—19 of FIG. 8.

Herein, the writing bar 39 is supported by brackets 134 to 137 (FIG. 8) on an elongated carrier rod 139 mounted on and extending across the inner side of the door 33. The bar is shaped as an angle iron and includes two right-angled flanges 140 and 141 (FIG. 19), the former being engageable with the web 40 and the latter serving to mount the bar on the brackets 134 to 137. As shown in FIGS. 9 and 19, the upper end of each bracket is slotted as indicated at 142 to receive the mounting flange 141, and the writing bar is anchored to the brackets by screws 144 threaded into the brackets and having washers 145 clamped against the writing flange 140.

The carrier rod 139 is supported on the door 33 for endwise sliding and for rocking in opposite directions about its own axis by a pair of brackets 146 (FIG. 8) fixed to the door and positioned intermediate the ends of the rod. The writing bar mounting bracket 134 is anchored rigidly to the rod 139 and thus, as the rod is slid in opposite directions within the brackets 146, the writing bar is reciprocated back and forth across the face of the web 40 to cause the bar to wear uniformly as it is decomposed during printing of the web. When the rod 139 is rocked counterclockwise (FIG. 9) about its axis, the writing bar is moved from its normal active position (FIG. 9) in engagement with the web to an inactive or retracted position (FIG. 10) spaced from the web to allow the latter to advance at a rapid rate without danger of being torn by the bar and the wire 37.

To reciprocate the writing bar 39, a lever 147 (FIG. 8) is pivoted to the door 33 at 149 and is operable, when rocked in a clockwise direction, to engage the right end of the carrier rod 139 and shift the latter and the writing bar to the left against the action of a coil spring 150 which returns the rod and the bar to the right when the lever is rocked in the opposite direction. Rocking of the lever is effected through a link 151 connected between the lever and a crank 153 rotatable with one end of a short shaft 154 projecting through the right side of the door. The other end of the shaft mounts a second crank 155 (FIGS. 1 and 8) which carries a roller follower 156 adapted, when the door is closed, to engage the periphery of a cam 157 located on the outer side of the right side wall 30 and rotatable with the feed roller 43. As the cam rotates, the cranks 153 and 155 are rocked first in one direction and then the other and, through the link 151, rock the lever 147 about the pivot 149 to slide the carrier rod 139 back and forth in the brackets 146 and thereby reciprocate the writing bar 39 across the face of the web 40.

Retraction of the writing bar 39 away from the wire 37 and the web 40 is accomplished with a solenoid 159 (FIGS. 2 and 8) mounted on the outer side of the left side wall 29 and having a reciprocable armature 160 which carries a pair of spaced upper and lower collars 161. The collars, when the door 33 is closed, slidably receive a crank 163 (FIG. 8) fast on the left end of the carrier rod 139 and located outside of the door 33 to slide back and forth between the collars when the carrier rod is reciprocated. When the solenoid 159 is energized, the lower collar 161 engages the crank 163 to rock the carrier rod counterclockwise (FIG. 9) within the brackets 146 and thereby retract the writing bar 39 away from the web 40 and to the inactive position shown in FIG. 10. Upon de-energization of the solenoid, the carrier rod is rocked in the opposite direction by the upper collar 161 to return the writing bar to its active position (FIG. 9). Advantageously, the solenoid is connected to be energized at the same time the high speed motor 116 is energized to initiate rapid feed of the web. As a result, the writing bar is automatically moved out of contact with the web when the latter begins advancing at a rapid rate and thus neither the bar nor the wire 37 will cause tearing of the web.

In order to enable adjustment of the writing bar 39 into precise parallel relation with the web 40 and the drum 36, the mounting brackets 135, 136 and 137 are adjustable angularly about the carrier rod 139 to permit shifting of the left end portion (FIG. 8) of the bar toward and away from the drum relative to the right end portion of the bar so that the bar can be spaced equal distances from the drum along the entire length of the bar. The brackets 135 and 137 are each mounted for turning on the carrier rod 139 and are tied to one another and to the anchored bracket 134 by a connecting rod 164 (FIG. 8) made of resilient metal and extending parallel to the carrier rod and the writing bar. By virtue of the connecting rod 164 and the writing bar, the rocking and reciprocating motions of the carrier rod 139 are transmitted in a positive manner from the anchored bracket 134 to the brackets 135, 136 and 137.

Angular adjustment of the brackets 135, 136 and 137 about the carrier rod 139 is effected by a screw 165 (FIG. 19) extending through the lower end portion of the bracket 136 and threaded into a tongue 166 projecting laterally from a clamp 167 (FIG. 8) which is anchored rigidly to the carrier rod 139 alongside the bracket 136. When the screw 165 is tightened, its head bears against the lower end portion of the bracket 136 to rock the latter counterclockwise (FIG. 19) about the carrier rod 139 and to cause similar rocking of the brackets 137 and 135 since the three brackets are tied together by the connecting rod 164. When the screw is loosened, a coil spring 169 (FIG. 19) telescoped over the screw and compressed between the tongue 166 and the bracket 136 acts to rock the brackets 135, 136 and 137 in the opposite direction about the carrier rod. Thus, by turning the screw, the brackets 135, 136 and 137 may be adjusted to various angular positions on the carrier rod and, as the brackets are adjusted, the left end portion of the writing bar 39 is shifted relative to the right end portion fastened to the fixed bracket 134 and is moved either toward or away from the drum 36 as determined by the direction of turning of the screw. The slots 142 in the brackets are formed with sufficient clearance to allow shifting of the left end of the bar relative to the right end. Also, the connecting rod 164 extends somewhat loosely through the brackets to accommodate such shifting. With the bar being adjustable, the web-contacting edge of the writing flange 140 may be shifted into exact parallelism with the web and the drum to insure contact of the bar with the web across the full width of the web and thereby promote uniform printing of the facsimile.

Figure 8:
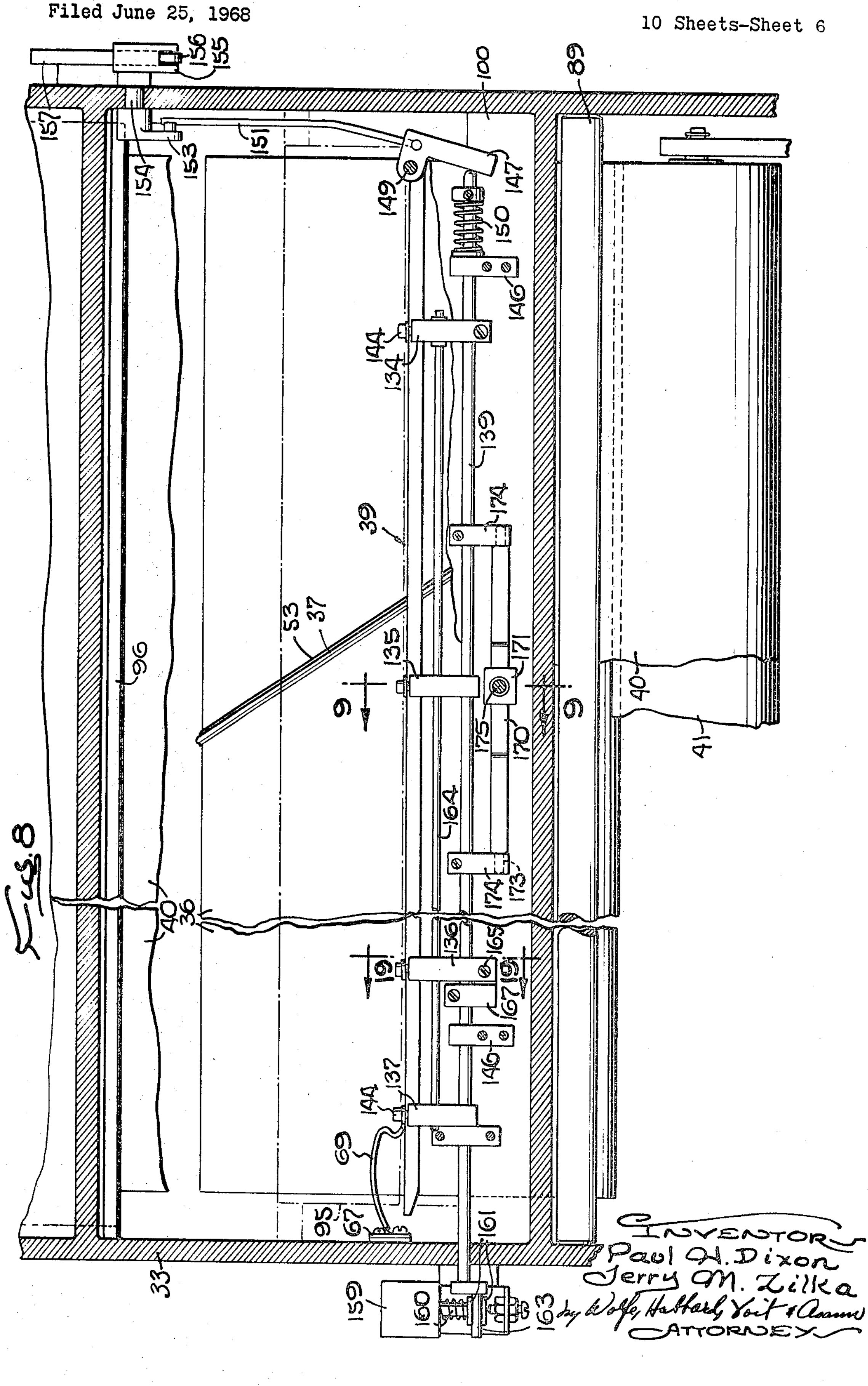
FIG. 8 is a fragmentary cross-section taken substantially along the line 8—8 of FIG. 3.

In addition to being reciprocable, retractable, and adjustable, the writing bar 39 is urged toward the drum 36 to press the web 40 against the wire 37 with a selected amount of pressure to effect proper developing of the web. As shown in FIGS. 8 and 9, a resiliently yieldable leaf spring 170 is held within a retainer 171 on the inside of the door 33 and is formed with end trunnions 173 (FIG. 8) which are loosely received in holes formed in crank arms 174 fastened rigidly to the carrier rod 139. The spring 170 is stressed to bias the crank arms 174 and the rod 139 in a clockwise direction (FIG. 9) about the axis of the rod thereby to urge the writing bar 39 against the web 40 and to press the latter against the wire 37. The force exerted by the spring, and thus the pressure applied by the bar, may be varied with an adjusting screw 175 (FIG. 9) threaded into the door 33 and accessible from the outer side thereof. The inner end of the screw 175 is fastened to the spring retainer 171 in such a manner that turning of the screw moves the retainer toward or away from the door to vary the loading in the spring. The spring insures that the web will be pressed into physical contact with the wire 37 along the entire operable length of the wire. In addition, the spring keeps the bar pressed against the web as the bar wears away.

We claim as our invention:

1. In a facsimile recorder, the combination of, a cabinet, a rotatable supply roll within said cabinet for paying out a flexible web treated with moist electrolyte, mechanism for drawing said web off of said supply roll and along a predetermined path, a signal-receiving drum rotatable within said cabinet and positioned on one side of said path to contact one side of said web, a writing bar positioned opposite said drum to contact the other side of the web and cooperable with the drum to change the shading of the web in proportion to variances in the signal received by the drum, means within said cabinet defining a first compartment enclosing said supply roll to help retain the moisture within said web, an opening in said first compartment permitting passage of said web from said compartment and along said path, means adjacent said opening for sealing against said web as the latter passes from said first compartment thereby to seal off said compartment from the remainder of the cabinet, means within said cabinet defining a second compartment enclosing said drum and said writing bar, a set of vents in said second compartment for admitting air into the second compartment, closures mounted on said cabinet and movable between positions covering and uncovering said vents, and means for sensing the humidity in said second compartment and for moving said closures to said covering positions when the humidity falls below a predetermined range and for moving said closures to said uncovering positions when the humidity rises above said predetermined range.

2. A facsimile recorder as defined in claim 1 in which said second compartment includes a passage located to permit movement of said web out of said second compartment after the web passes by said drum, and means adjacent said passage for sealing against said web as the latter passes out of said second compartment thereby to seal off the second compartment from the remainder of the cabinet.

3. In a facsimile recorder, the combination of, a frame, a rotatable supply roll on said frame for paying out a flexible web treated with electrolyte, a feed roll journaled on said frame and operable when rotated to draw the web off of said supply roll and along a predetermined path, a signal-receiving drum rotatable on said frame and positioned on one side of said path to contact one side of said web, a writing bar positioned opposite said drum to contact the other side of the web and cooperable with the drum to change the shading of the web in proportion to variances in the signal received by the drum, differential gearing having first and second rotatable input elements and having a rotatable output element connected to said feed roll to rotate the latter at a rate determined by the sum of the motions of said input elements, a drive motor connected to said drum and said first input element and operable when energized to rotate said drum and said feed roll in timed relation whereby said web is drawn past said drum at a recordng rate correlated with the speed of the drum, and means connected to drive said second input element and selectively operable while said drive motor is energized to add to the rotational motion imparted to said feed roll by said drive motor thereby to cause the web to advance past said drum at a rapid feed-out rate considerably faster than said recording rate.

4. A facsimile recorder as defined in claim 3 in which said means comprises a second drive motor connected to said second input element and selectively operable to rotate said feed roll at a rate faster than that effected by said first drive motor.

5. A facsimile recorder as defined in claim 4 in which said writing bar is mounted on said frame for movement into and out of contact with said web, and mechanism responsive to energization of said second drive motor for shifting the bar out of contact with the web thereby to free the latter for advancement at said feed-out rate.

6. In a facsimile recorder, the combination of, a frame, mechanism on said frame for advancing a flexible, electrolyte-treated web along a predetermined path, said mechanism comprising a first drive motor for feeding said web along said path at a recording rate, and a second drive motor for feeding said web along said path at a faster feed-out rate, a drum rotatable about its own axis on one side of said path and carrying a signal-receiving conductor spiraled around the drum and positioned adjacent one side of the web, an elongated writing bar extending transversely of said web opposite said drum and cooperable with the conductor to change the shading of the web in proportion to variances in the signal received by the conductor, an elongated carrier rod for supporting said writing bar and guided on said frame for back and forth reciprocation parallel to the drum and for rocking in opposite directions about its own axis, a first bracket anchored on said carrier rod and attached to said writing bar to mount the latter for reciprocation and rocking with the bar, a second bracket attached to said writing bar in spaced relation with said first bracket and adjustable to different angular positions on said carrier rod to enable positioning of the bar in exact parallelism with the web and the axis of the drum, a spring biasing the carrier rod to rock in one direction and urging said writing bar toward said drum and into contact with the web to press the web against said conductor, said spring being selectively adjustable to vary the pressure exerted by the bar on the web, and selectively operable means for rocking the rod in the opposite direction to retract said bar away from the web to an inactive position spaced from the web, said selectively operable means retracting said bar in response to energization of said second drive motor whereby the bar is spaced from the web when the latter is advanced at said feed-out rate.

References Cited

UNITED STATES PATENTS

| | | | |
|---|---|---|---|
| 2,505,779 | 5/1950 | Long | 346—74 |
| 2,908,540 | 10/1959 | Bell et al. | 346—74 |
| 3,240,871 | 3/1966 | La Rue | 346—74 |

J. RUSSELL GOUDEAU, Primary Examiner

U.S. Cl. X.R.

178—6.6; 346—101